United States Patent
Kawazoe (10) Patent No.: US 9,700,948 B2
(45) Date of Patent: Jul. 11, 2017

(54) HEIGHT ADJUSTMENT APPARATUS FOR A CAN BODY

(71) Applicant: Daiwa Can Company, Chiyoda-ku (JP)

(72) Inventor: Akira Kawazoe, Sagamihara (JP)

(73) Assignee: DAIWA CAN COMPANY, Chiyoda-ku (JP)

( * ) Notice: Subject to any disclaimer, the term of this patent is extended or adjusted under 35 U.S.C. 154(b) by 149 days.

(21) Appl. No.: 14/849,048

(22) Filed: Sep. 9, 2015

(65) Prior Publication Data

US 2016/0067799 A1  Mar. 10, 2016

(30) Foreign Application Priority Data

Sep. 9, 2014  (JP) ................................. 2014-183002

(51) Int. Cl.
*B23D 31/00* (2006.01)
*B21D 51/26* (2006.01)

(52) U.S. Cl.
CPC ............ *B23D 31/001* (2013.01); *B21D 51/26* (2013.01)

(58) Field of Classification Search
CPC .... B23D 35/00; B23D 35/001; B23D 35/002; B23D 31/001; B23D 31/00; B21D 51/26; B21D 28/16; B26D 3/10

See application file for complete search history.

(56) References Cited

U.S. PATENT DOCUMENTS

| 2,521,975 | A | * | 9/1950 | Hartup | .................... | B21D 24/16 |
| | | | | | | 83/125 |
| 3,186,459 | A | * | 6/1965 | Van Raay | .............. | A23N 15/08 |
| | | | | | | 99/636 |
| 3,629,913 | A | * | 12/1971 | Gold | ...................... | B21D 24/16 |
| | | | | | | 83/186 |
| 4,257,293 | A | * | 3/1981 | Stahl | .................... | B23D 31/001 |
| | | | | | | 83/193 |
| 4,261,274 | A | * | 4/1981 | Spanraft | .............. | B23D 31/001 |
| | | | | | | 219/121.85 |
| 4,485,661 | A | * | 12/1984 | Hehl | ...................... | B21D 22/21 |
| | | | | | | 72/326 |
| 4,502,313 | A | * | 3/1985 | Phalin | .................... | B21D 22/28 |
| | | | | | | 72/342.3 |

(Continued)

FOREIGN PATENT DOCUMENTS

JP  4-505129  9/1992
WO  WO 90/06829 A1  6/1990

*Primary Examiner* — Will Fridie, Jr.
(74) *Attorney, Agent, or Firm* — Oblon, McClelland, Maier & Neustadt, L.L.P.

(57) ABSTRACT

A height adjustment apparatus that can reduce a load to trim a can body is provided. The height adjustment apparatus 1 is adapted to adjust a height of a can body to a desired height by trimming one of opening ends of the can body. The height adjustment apparatus comprises: mandrels on which the can body is individually mounted and which revolve along a predetermined orbit while rotating; outer blades arranged around the revolution orbit of the mandrels; an inner blade fitted onto each mandrel to trim the opening end of the can body together with the outer blade; and a vertical reciprocator that gradually changes a level of the opening end of the can body with respect to a level at which the outer blade and the inner blade are situated from an upstream side toward a downstream side in a revolution direction of the mandrel.

3 Claims, 6 Drawing Sheets

(56) References Cited

U.S. PATENT DOCUMENTS 4,553,464 A * 11/1985 Turner ................. B23D 31/001
83/188
2016/0067799 A1* 3/2016 Kawazoe ............. B23D 31/001
82/54

* cited by examiner

HEIGHT ADJUSTMENT APPARATUS FOR A CAN BODY

The present invention claims the benefit of Japanese Patent Application No.2014-183002 filed on Sep. 9, 2014 with the Japanese Patent Office, the disclosure of which is incorporated herein by reference in its entirety.

BACKGROUND

Field of the Invention

The present invention relates to an art of an apparatus for adjusting a height of a can body by trimming an opening of the can body.

Discussion of the Related Art

JP-A-H4-505129 described an apparatus for use in trimming can bodies. The apparatus taught by JP-A-H4-505129 comprises a rotatable turret having a plurality of mounting surfaces that is secured to a main drive shaft, and a can trimming apparatus secured on the mounting surface of the turret. An uneven edge of the can body supported by a can body supporting means is trimmed to form a can body of the proper axial extent. A trimmed away portion from the can body is deflected by a scrap deflector.

According to the teachings of JP-A-H4-505129, the uneven edge at an open end of the can body is trimmed away to form a can body of the desired axial extent by a single operation. However, if a large part of the can body is trimmed away by a single operation, a large cylindrical scrap would be produced and hence the can trimming apparatus and a main drive shaft would be subjected to a large load to cut the cylindrical scrap into a plate shape.

SUMMARY OF THE INVENTION

The present invention has been conceived nothing the foregoing technical problems, and it is therefore an object of the present invention is to provide a height adjustment apparatus for a can body that can reduce a load applied to the apparatus during trimming of can bodies.

The present invention relates to a height adjustment apparatus for adjusting a height of a cylindrical can body to a desired height by trimming one of opening ends of the can body. In order to achieve the above-explained objectives, according to the present invention, the height adjustment apparatus is provided with: a plurality of mandrels on which the can body is individually mounted and which revolve along a predetermined orbit while rotating; a plurality of outer blades arranged around the revolution orbit of the mandrels; an inner blade fitted onto each mandrel to trim the opening end of the can body together with the outer blade; and a vertical reciprocator that gradually changes a level of the opening end of the can body with respect to a level at which the outer blade and the inner blade are situated from an upstream side toward a downstream side in a revolution direction of the mandrel.

Specifically, the outer blades are situated at a same level around the revolution orbit of the mandrels, and a level of each of the inner blade fitted onto the mandrel is adjusted to the same level as the outer blades to be opposed thereto. In addition, the vertical reciprocator is adapted to situate the opening end of the can body at a highest position within a range to be trimmed by the outer blade of the most upstream side, and to situate the opening end of the can body at a lowest position within a range to be trimmed by the outer blade of the most downstream side.

For example, a cylindrical cam adapted to vertically reciprocate the can body by a rotational motion thereof may serve as the vertical reciprocator.

Thus, the height adjustment apparatus according to the present invention, a plurality of outer blades are arranged around the revolution orbit of the mandrels to trim the opening end of the can body together with the inner blades fitted onto each mandrel. In addition, the vertical reciprocator is adapted to gradually change a level of the opening end of the can body with respect to the level at which the outer blade and the inner blade are situated from an upstream side toward a downstream side in a revolution direction of the mandrels. According to the present invention, therefore, the opening end of the can body can be trimmed plurality of times by those inner and outer blades to achieve a desired height of the can body during one revolution of the can body fitted onto the mandrel. In addition, the trimmed away scrap produced as a result of trimming the can body can be downsized, and a cutting load applied to open the annular scrap remaining around the mandrel can be reduced. Further, a trimming amount of the can body can be adjusted finely by manually adjusting a level of the vertical reciprocator. According to the present invention, therefore, can bodies other than standard shape may also be trimmed easily without requiring modification of the apparatus.

As described, the outer blades are situated at the same level around the revolution orbit of the mandrels, and the level of each inner blade fitted onto the mandrel is adjusted to the same level as the outer blades to be opposed thereto. According to the present invention, therefore, a load to trim the opening end of the can body is applied homogeneously to each mandrels and each pair of inner and outer blades at the same level. In addition, the can body is fitted onto the mandrel gradually deeply from the upstream side to the downstream side of the revolution direction of the mandrel so that the opening end of the can body is allowed to be trimmed gradually from the upstream side to the downstream side.

As also described, the cylindrical cam may be employed as the vertical reciprocator. According to the present invention, therefore, circular motion of the mandrel around the cylindrical cam can be converted easily into a reciprocating motion.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Hereinafter, a preferred example of the height adjustment apparatus will be explained in more detail with reference to the accompanying drawings.

Figure 1:
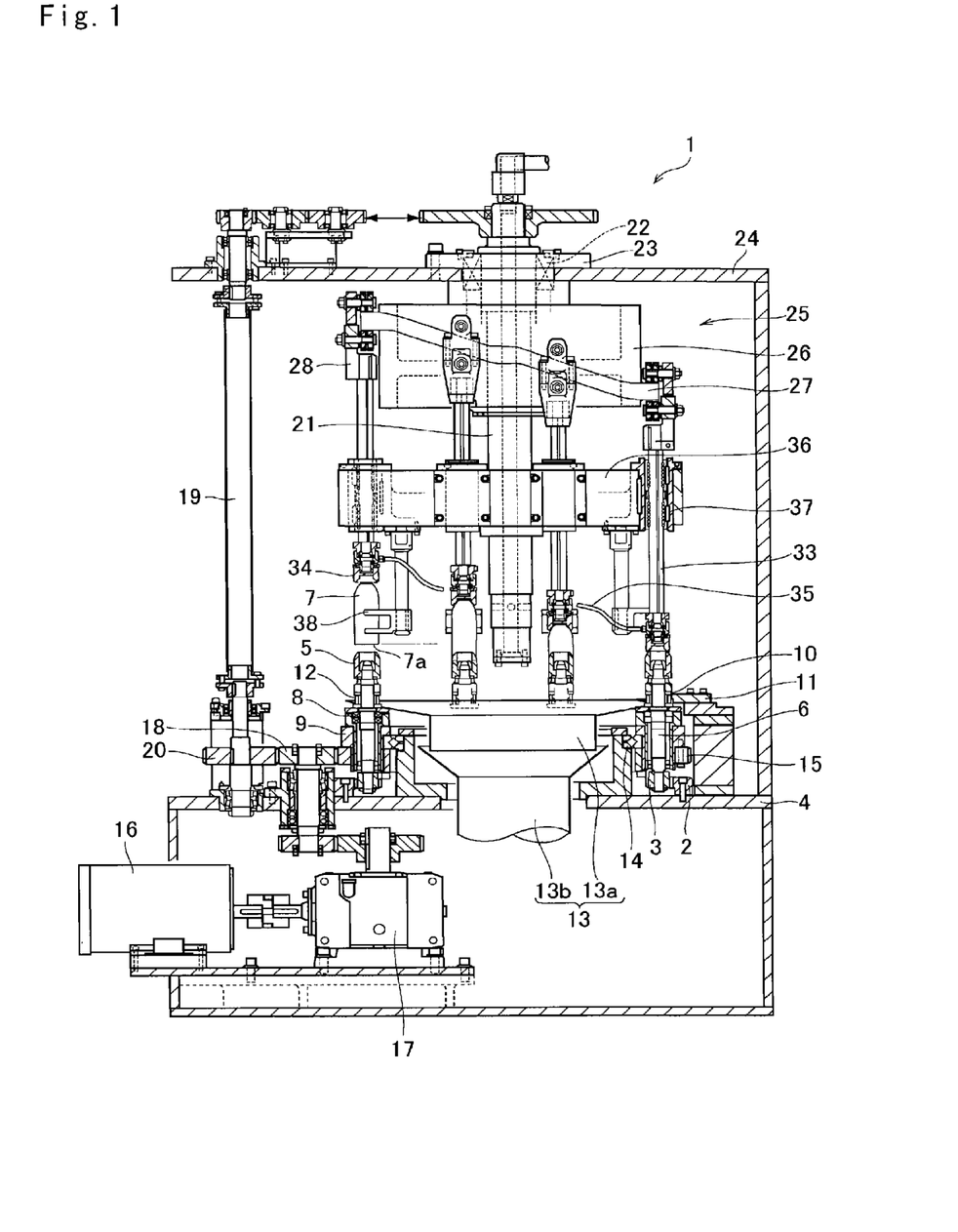
FIG. 1 is a cross-sectional view of the height adjustment apparatus according to the preferred example.

Referring now to FIG. 1, there is shown a cross-section of the height adjustment apparatus 1 according to the preferred example. The height adjustment apparatus is provided with a ring gear 2 as an internal gear that is attached to a lower frame 4. A plurality of pinion gears 3 are arranged along an inner circumference of the ring gear 2 at predetermined intervals while meshing therewith, and individually connected to each spindle shaft 6 of a mandrel 5 on which a can body 7 to be trimmed is mounted. Each pinion gear 3 revolves along the inner circumference of the ring gear 2, and consequently the mandrel 5 is rotated by a rotation of the pinion gear 3. Specifically, the can body 7 is allowed to be fitted onto the mandrel 5 until an inner face thereof comes into contact to a leading end of the mandrel 5. The can body 7 can be exemplified by an aerosol can before trimmed into a desired height, and a lower opening end 7a of the can body 7 is diametrically larger than that of the other opening on which a not shown valve assembly is to be mounted.

Each spindle shaft 6 is rotatably attached to a spindle turret 9 through a bearing 8, and an annular inner blade 10 is fitted onto the spindle shaft 6. A plurality of segment-like outer blades 11 are arranged radially outer side of the inner blades 10 at a same level while being opposed thereto in the circumferential direction so that the lower opening end 7a of each can body 7 mounted on the mandrel 5 is trimmed by the inner blade 10 and the outer blade 11. Consequently, a cylindrical trimmed away portion as a scrap is produced.

A knurling gear 12 is individually fitted onto each spindle shaft 6 under the inner blade 10, and a plurality of segment-like knurling plates 41 individually having an inner knurling edge are arranged radially outer side of the knurling gears 12 at a same level while being opposed thereto in the circumferential direction. That is, the outer blades 11 and the knurling plates 41 are arranged alternately around the can bodies 7 mounted on the mandrels 5. The trimmed away scrap produced as a result of trimming the lower opening end 7a of the can body 7 remaining around the mandrel 5 is opened and then knurled by the knurling gear 12 and the knurling plate 41. According to the example shown in FIG. 1, the above-mentioned ring gear 2 has 286 teeth, each pinion gear 3 has 22 teeth, and each knurling gear 12 has 13 teeth. Thus, teeth numbers of the ring gear 2 and each pinion gear 3 are determined in such a manner to obtain integer divisor therebetween, and teeth number of each knurling gear 12 is set to the integer divisor between the ring gear 2 and each pinion gear 3.

A funnel-shaped scrap duct 13 is arranged radially inner side of the spindle turret 9, and the trimmed away scraps are thrown into the scrap duct 13. The scrap duct 13 is comprised of an upper duct 13a fixed to the spindle turret 9 below the knurl gear 12 and a lower duct 13b fixed to the lower frame 4, and the spindle shafts 6 penetrate through a shoot portion of the upper duct 13a. An outer race of a cross-roller bearing 14 is fitted with the spindle turret 9, and an inner race of the cross-roller bearing 14 is fitted with a member fixed to the lower frame 4. That is, the upper duct 13a is rotated together with the spindle turret 9 relatively with the lower duct 13b. A main gear 15 as an external gear is fitted onto the spindle turret 9 while being meshed with a drive gear 18.

The height adjustment apparatus 1 is provided with a motor 16 serving as a power source, and a motor reducer 17 is connected to an output side of the motor 16. The above-mentioned drive gear 18 is connected to an output side of the motor reducer 17 to be meshed with the main gear 15 so that an output torque of the motor 16 is transmitted to the main gear 15 through the motor reducer 17 and the drive gear 18. In the height adjustment apparatus 1, therefore, the spindle turret 9 is allowed to be rotated relatively with respect to the lower duct 13b, and the pinion gears 3, the mandrels 5 and the knurl gears 12 are revolved along the inner circumferential edge of the ring gear 2 while being rotated.

A floating joint 19 extends parallel to a rotational axis of the spindle turret 9, and a driven gear 20 is connected to a lower end of the floating joint 19 while being meshed with the drive gear 18. A main shaft 21 extends parallel to the floating joint 19 and concentrically with the spindle turret 9, and an upper end of the main shaft 21 is connected to an upper end of the floating joint 19. The upper end of the main shaft 21 is held by a sleeve 23 fixed to an upper frame 24 through a bearing 22. A lower end of the main shaft 21 extends toward the scrap duct 13.

Figure 2:
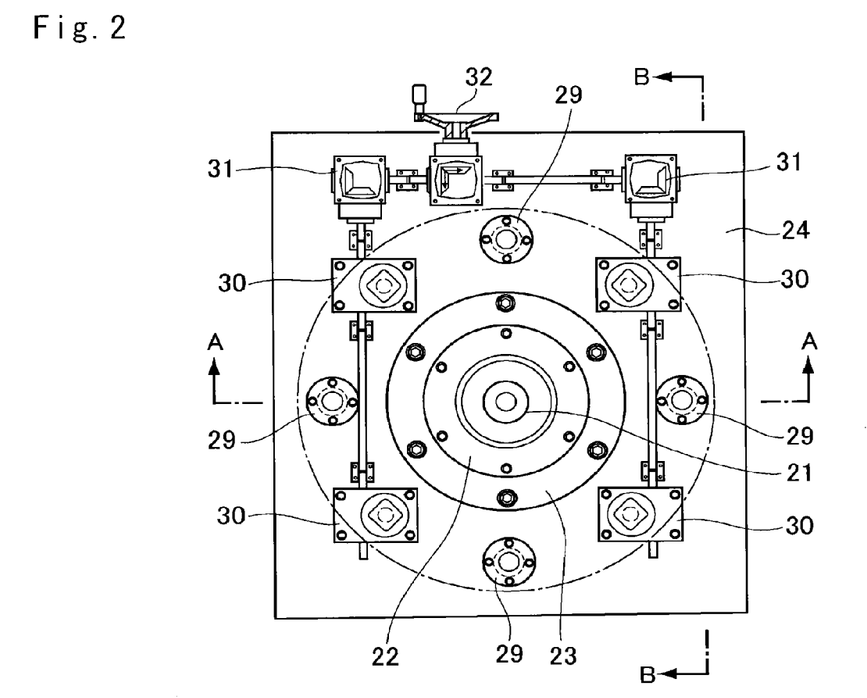
FIG. 2 is a top plan view of the height adjustment apparatus according to the preferred example.
Figure 3:
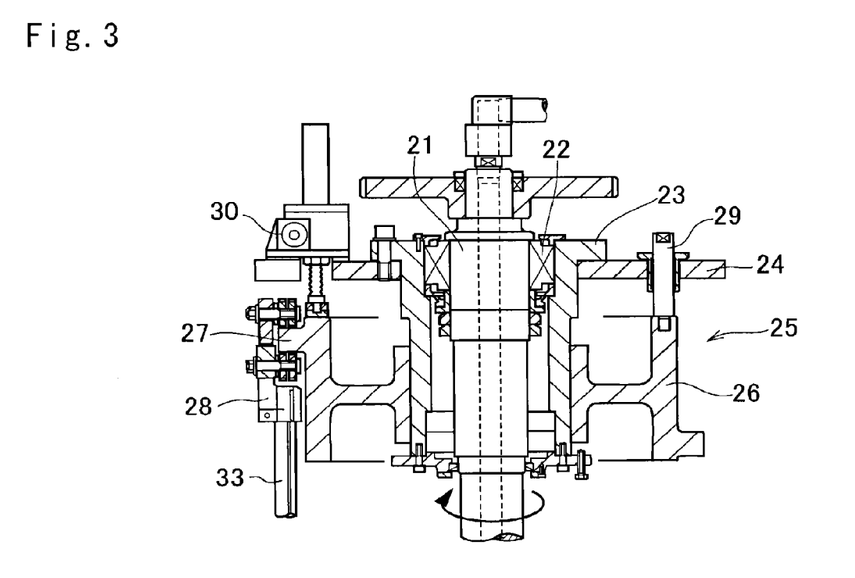
FIG. 3 is a cross-sectional view showing a cross-section of the height adjustment apparatus along the line A-A in FIG. 2.
Figure 4:
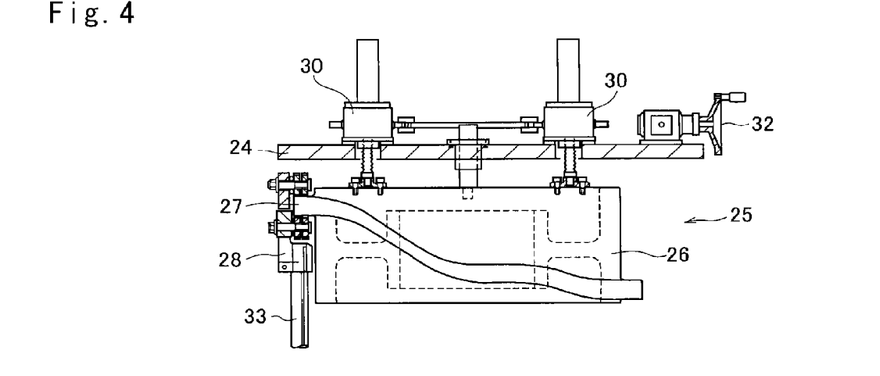
FIG. 4 is a cross-sectional view showing a cross-section of the height adjustment apparatus along the line B-B in FIG. 2.

As shown in FIGS. 3 and 4, a cylindrical cam 25 serves as the claimed vertical reciprocator is brought into contact with an outer circumferential face of the sleeve 23. Specifically, the cylindrical cam 25 comprises a cylindrical portion 26, an annular cam 27 having a wavy cam surface, and a cam follower 28 vertically reciprocated along the cam surface. An inner circumferential face of the cylindrical portion 26 is brought into contact with an outer circumferential face of the sleeve 23 in a slidable manner. As depicted in FIGS. 2 and 3, the cylindrical portion 26 is fixed to the upper frame 24 through a plurality of cylindrical bushes 29 while being allowed to be moved vertically by a jack 30. The jack 30 is connected to a hand-wheel 32 through a gear box 31. Optionally, the cylindrical portion 26 may also be moved electrically in the vertical direction by an additional motor connected to the jack 30.

The annular cam 27 has a plurality of flat portions perpendicular to the center axis of the cylindrical portion 26. Although not especially shown, the annular cam 27 is provided with first to fifth flat portions around the cylindrical portion 26 at different levels, and those flat portions are connected through smooth slopes. Specifically, the first flat portion is situated at an uppermost level in a rotational direction of the main turret 36, the fifth flat portion is situated at the second highest level, and the second flat portion is situated at an intermediate level. The third flat portion is situated at a second lowest level, and the fourth flat portion is situated at a lowest level. In the height adjustment apparatus 1, the can body 7 is fed from an infeed turret 39 to the can holder 34 at a level of the first flat portion of or slightly lower level, and the can body 7 trimmed into a desired height is fed from the can holder 34 to a discharge turret 40 at a level of the fifth flat portion. The above-mentioned outer blade 11 is situated at each level of the second to fourth flat portions.

An upper end of a cam rod 33 is joined to the cam follower 28, and the can holder 34 is fitted onto a lower end of the cam rod 33 in a rotatable manner. According to the preferred example, a suction tube 35 having a not shown distribution valve therein provides a connection between the can holder 34 and a not shown vacuum pump and a not shown compressor through the main shaft 21. The distribution valve comprises a first port providing a communication between the suction tube 35 and the vacuum pump, and a second port providing a communication between the suction tube 35 and the compressor. Specifically, the distribution valve establishes the communication between the suction tube 35 and the compressor through the second port when the can holder 34 reaches above the discharge turret 40, and in this situation, the compressor delivered compressed air to the can holder 34 situated above the discharge turret 40 through the suction tube 35. By contrast, the distribution valve establishes the communication between the suction tube 35 and the vacuum pump through the first port when the can holder 34 is not situated above the discharge turret 40, and in this situation, the upper end of the can body 7 is secured by the can holder 34 through a suction force established by the vacuum pump. In addition, the can holders 34 are rotated in synchronization with the mandrels 5.

As illustrated in FIG. 1, a main turret 36 is fitted onto the main shaft 21, and each cam rod 33 individually penetrates through the main turret 36 while being allowed to reciprocate vertically. That is, the cam rods 33 are revolved with a rotation of the main turret 36 achieved by rotating the main shaft 21 by the motor 16. Consequently, the cam followers 28 are reciprocated vertically together with the can holder 34 along the annular cam 27.

A turret pocket 38 is attached to the main turret 36 to receive the can body 7 from the infeed turret 39 so that the can body 7 is secured by a vacuum pad of the can holder 34 while being held in the turret pocket 38.

Figure 5:
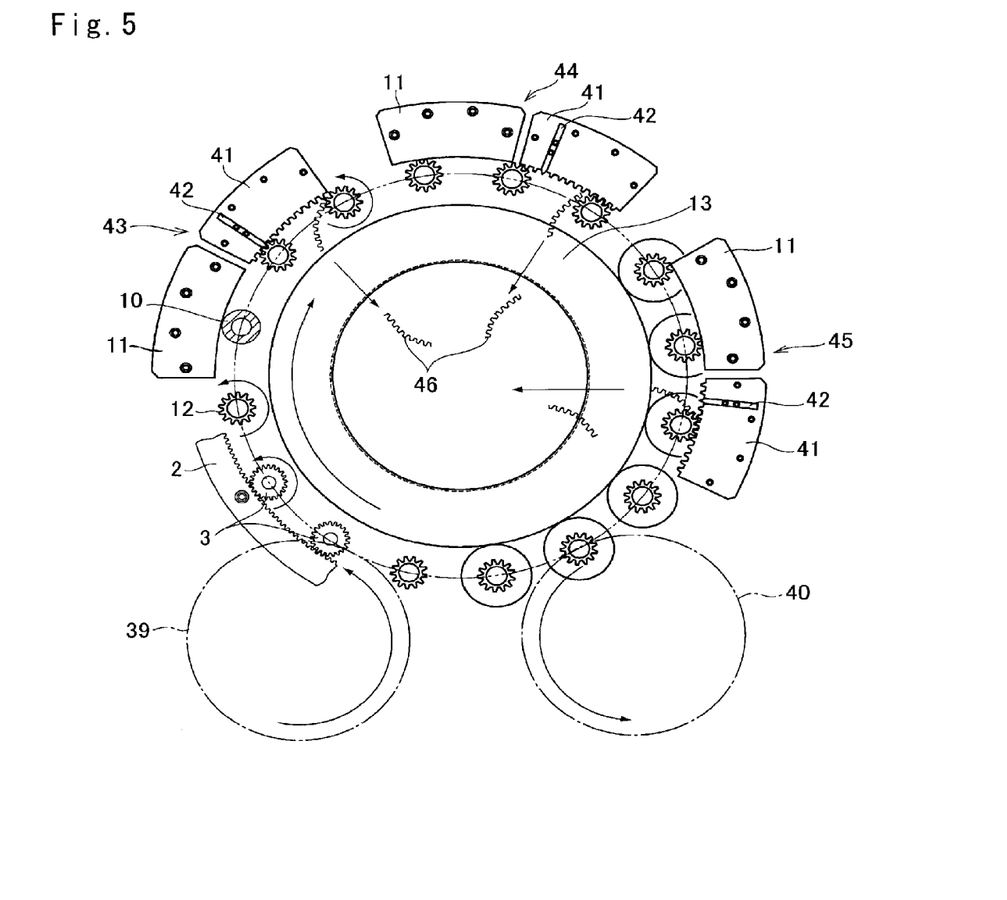
FIG. 5 is a partial top plan view of the height adjustment apparatus according to the preferred example.

As illustrated in FIG. 5, the infeed turret 39 and the discharge turret 40 are situated radially outer side of the ring gear 2 in such a manner that the center axes thereof are aligned parallel to one another. In order to feed the can body 7 to the can holder 34, the infeed turret 39 is partially overlapped with a revolution orbit of the can holder 34. That is, a point at which the infeed turret 39 is overlapped with the revolution orbit of the can holder 34 is a feeding point of the can body 7 to the height adjustment apparatus 1.

As also illustrated in FIG. 5, according to the preferred example, three outer blades 11 are arranged halfway around the revolution orbit of the mandrel 5 in a downstream side of the feeding point while being isolated away from one another, and the aforementioned turrets 39 and 40 are arranged on the other side of the outer blades 11. Three knurling plates 41 are also arranged halfway around the revolution orbit of the mandrel 5 in the downstream side of each outer blade 11 alternately with the outer blades 11. Each knurling plate 41 is individually provided with a chopper 42 at a slightly downstream side of the most upstream portion to open the annular trimmed away scrap produced by trimming the lower opening end 7a of the can body 7 by the inner blade 10 and the outer blade 11 remaining around the mandrel 5. In the following description, each pair of the outer blade 11 and the knurling plate 41 will be called a first trimming section 43, a second trimming section 44 and a third trimming section in order from the most upstream side from the feeding point. The can body 7 is trimmed into a desired height by trimming away the lower opening end 7a stepwise from the first trimming section 43 to the third trimming section 45, and the resultant annular scrap remaining around the mandrel 5 is opened by the chopper 42. Then, the trimmed away scrap is knurled by the knurling gear 12 and the knurling plate 41 and thrown into the scrap duct 13.

In order to send the can bodies 7 thus trimmed to the subsequent processes, the discharge turret 40 is situated in the downstream side of the third trimming section 45. To this end, as the infeed turret 39, the discharge turret 40 is partially overlapped with a revolution orbit of the can holder 34. That is, a point at which the discharge turret 40 is overlapped with the revolution orbit of the can holder 34 is a discharging point of the trimmed can body 7 from the height adjustment apparatus 1.

Figures 6A, 6B:
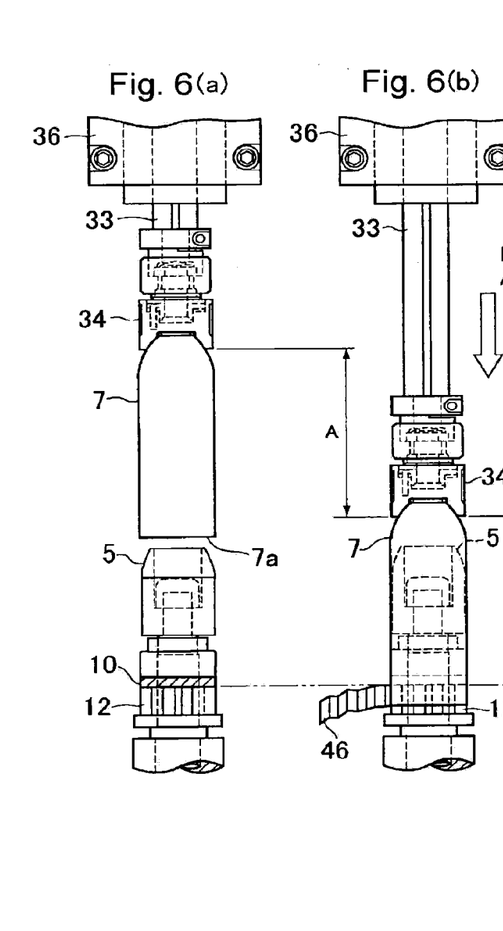
FIGS. 6(a) to 6(e) are explanatory illustrations showing strokes of the can holder during trimming procedures.

Turning now to FIGS. 6(a)-6(e), there are shown strokes of the can holder 34 during trimming procedures of the can body 7. In the main turret 36 rotated together with the can holders 34, the can body 7 is fed from the infeed turret 39 to the turret pocket 38 at the feeding point during an initial phase of downstroke of the cam follower 28 from the first flat portion toward the second flat portion. In this situation, as shown in FIG. 6(a), the can body 7 is secured to the vacuum pad of the can holder 34 above the mandrel 5. The cam follower 28 descends from the first flat portion to the second flat portion with the rotation of the main turret 36 in the direction toward the discharge turret 40. Consequently, the can holder 34 descends toward the mandrel 5 in a downstroke amount A shown in FIG. 6(b). In this situation, the can body 7 secured to the vacuum pad of the can holder 34 is fitted onto the mandrel 5 in the downstroke amount A to a level at which the lower opening end 7a is situated lower than the internal blade 10. As described, the mandrel 5 is rotated together with the pinion gears 3 so that the can body 7 is rotated together with the mandrel 5 while revolving along the inner circumferential edge of the ring gear 2.

When the mandrel 5 on which the can body 7 is thus mounted reaches the first trimming section 43, the lower opening end 7a of the can body 7 is trimmed by the inner blade 10 and the outer blade 11. In this situation, a resultant annular trimmed away scrap 46 still remains around the mandrel 5 until the can body 7 reaches the chopper 42 arranged in the downstream side of the most upstream portion of the knurling plate 41 so that the annular scrap 46 is partially knurled by the knurling gear 12 and the knurling plate 41. Then, the partially knurled annular scrap 46 is opened by the chopper 42 and drawn in between the knurling gear 12 and the knurling plate 41 to be knurled entirely as illustrated in FIG. 6(b). The entirely knurled scrap is thrown into the scrap duct 13 as illustrated in FIG. 5.

Figures 6C, 6D:
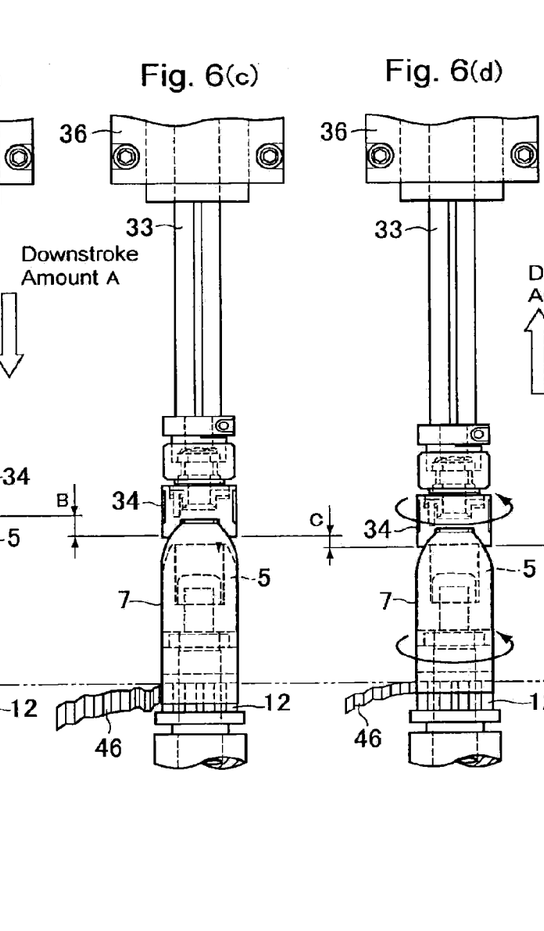

Then, the cam follower 28 further moves from the second flat portion to the third flat portion with the rotation of the main turret 36, and consequently enters into the second trimming section 44 while further descending in a downstroke amount B shown in FIG. 6(c). Consequently, the lower opening end 7a of the can body 7 is brought down below the inner blade 10 in the downstroke amount B. That is, the can body 7 is fitted on the mandrel 5 deeper than before in the downstroke amount B. In this situation, the lower opening end 7a of the can body 7 is trimmed again by the inner blade 10 and the outer blade 11. Resultant trimmed away annular scrap 46 remaining around the mandrel 5 is opened and knurled by the same procedure as in the first trimming section 43, and then thrown into the scrap duct 13.

Eventually, the cam follower 28 further moves from the third flat portion to the fourth flat portion with the rotation of the main turret 36, and consequently enters into the third trimming section 45 while further descending in a downstroke amount C shown in FIG. 6(d). Consequently, the lower opening end 7a of the can body 7 is again brought down below the inner blade 10 in the downstroke amount C. That is, the can body 7 is fitted on the mandrel 5 deeper than before in the downstroke amount C until an inner surface of the upper end portion thereof is brought into contact with the mandrel 5. In this situation, the lower opening end 7a of the can body 7 is trimmed again by the inner blade 10 and the outer blade 11. Resultant trimmed away annular scrap 46 remaining around the mandrel 5 is opened and knurled by the same procedure as in the first trimming section 43, and then thrown into the scrap duct 13. As a result, the can body 7 is trimmed into a desired height. Thus, according to the preferred example, the lower opening end 7a of the can body is trimmed three times to adjust the height thereof.

Figure 6E:
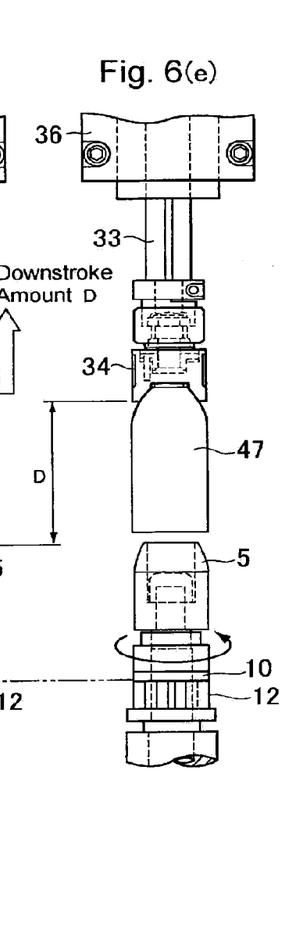

Finally, the cam follower 28 further moves from the fourth flat portion to the fifth flat portion with the rotation of the main turret 36, and consequently comes out of the third trimming section 45 while ascending toward the main turret 36 in an upstroke amount D shown in FIG. 6(e). As a result, the can body 7 is dismounted from the mandrel 5. Then, the distribution valve is switched to establish a communication between the suction tube 35 and the compressor through the second port to deliver compressed air to the can holder 34. Consequently, the can body 7 drops from the can holder 34 onto the discharge turret 40 to be sent to the subsequent processes.

Figure 7:
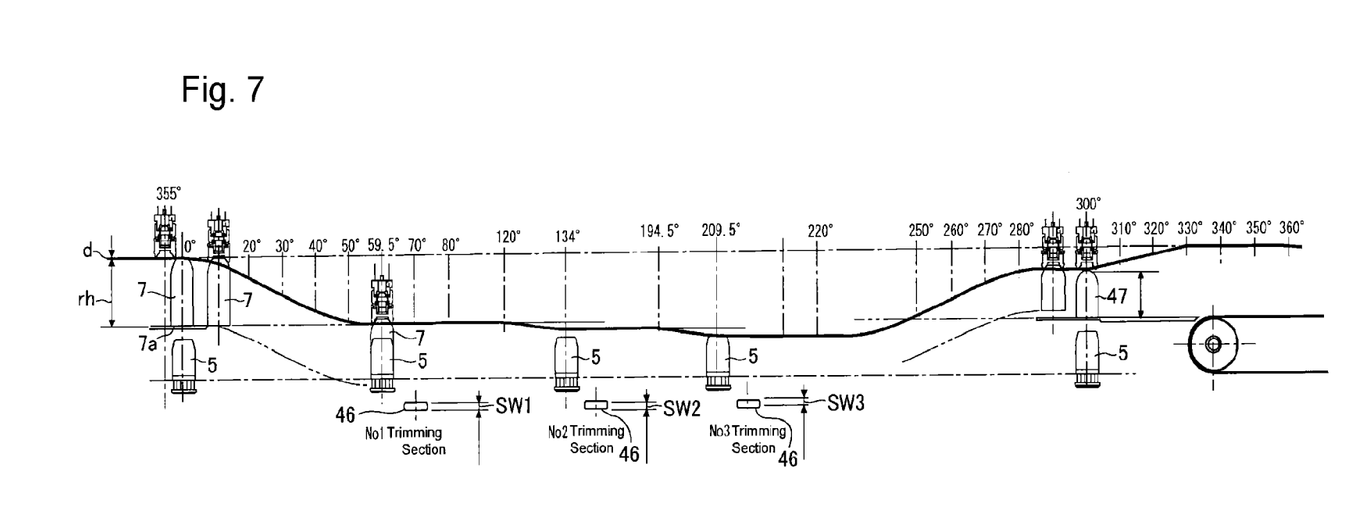
FIG. 7 is a time chart showing a vertical stroke of the mandrel in case of trimming the can body into a short can body.

Temporal change in the stroke of the can holder 34 holding a short can will be explained with reference to the time chart shown in FIG. 7. In case of trimming the can body 7 into a relatively short height, the can body 7 is fitted onto the mandrel 5 relatively deeper. To this end, the cylindrical cam 25 in which the cam follower 28 is situated in the first flat portion is lowered toward the scrap duct 13 by operating the jack 30 to reduce a distance "d" between the can holder 34 and the upper end of the can body 7. According to the example shown in FIG. 7, an initial distance "d" between the can holder 34 and the upper end of the can body 7 is set to 4.3 mm, an initial height "rh" of the can body 7 is 180.7 mm, and a zero point (i.e., 0°) of an orbital motion of the can body 7 is set at a downstream end of the first flat portion.

When the can holder 34 revolves about 10 degrees with respect to the zero point, the distance "d" between the can holder 34 and the upper end of the can body 7 is reduced to zero whereby the can body 7 adheres to the vacuum pad of the can holder 34. Then, when the can holder 34 further revolves about 60 degrees with respect to the zero point, the cam follower 28 reaches the second flat portion. Consequently, the can holder 34 is lowered in the downstroak amount A so that the man body 7 is fitted onto the mandrel 5. In this situation, the lower end 7a of the can body 7 is situated lower than the inner blade 10 to be trimmed in the first trimming section 43. As described, the resultant trimmed away portion is opened to be knurled and then thrown into the scrap duct 13. A width sw1 of the trimmed away scrap 46 produced at the first trimming section, that is, a trimmed amount sw1 of the can body 7 at the first trimming section is 18.7 mm.

Then, when the can holder 34 further revolves about 134 degrees with respect to the zero point, the cam follower 28 reaches the third flat portion so that the can holder 34 is further lowered in the downstroak amount B. Consequently, the lower end 7a of the can body 7 is lowered again to be lower than the inner blade 10 and trimmed in the second trimming section 44. A trimmed amount sw2 of the can body 7 at the second trimming section is 20.0 mm. Then, when the can holder 34 further revolves about 210 degrees with respect to the zero point, the cam follower 28 reaches the fourth flat portion so that the can holder 34 is further lowered in the downstroak amount C. Consequently, the lower end 7a of the can body 7 is lowered again to be lower than the inner blade 10 and trimmed in the third trimming section 45. A trimmed amount sw3 of the can body 7 at the third trimming section is also 20.0 mm, and as a result, a height "h" of a final product 47 is adjusted to 122.0 mm. Then, the cam follower 28 reaches the fifth flat portion thereby ascending the can holder 34 in the upstroke amount D while detaching the can body 7 therefrom. Then, when the can holder 34 further revolves about 300 degrees with respect to the zero point, the can body 7 drops onto the discharge turret 40. Eventually, the cam follower 28 reaches the first flat portion and the can holder 34 returns to the zero point.

Figure 8:
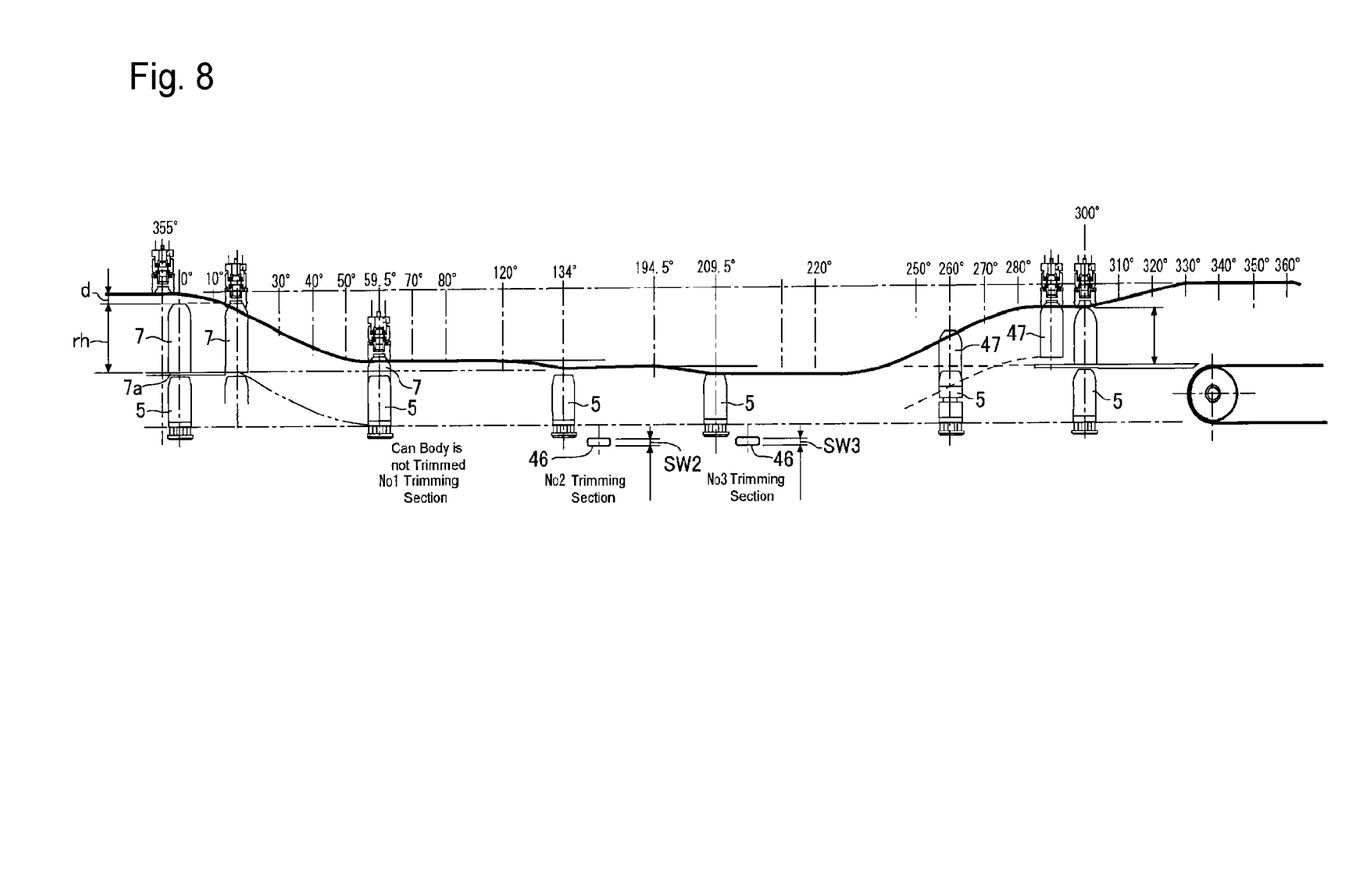
FIG. 8 is a time chart showing a vertical stroke of the mandrel in case of trimming the can body into a tall can body.

Turning to FIG. 8, there is shown a time chart showing temporal change in the stroke of the can holder 34 in case of trimming the can body 7 into a relatively tall height. In this case, the can body 7 is fitted onto the mandrel 5 relatively shallower. To this end, the cylindrical cam 25 in which the cam follower 28 is situated in the first flat portion is raised toward the upper frame 24 by operating the jack 30 to increase a distance "d" between the can holder 34 and the upper end of the can body 7. According to the example shown in FIG. 8, the initial distance "d" between the can holder 34 and the upper end of the can body 7 is set to 26.5 mm, the initial height "rh" of the can body 7 is also 180.7 mm, and a zero point (i.e., 0°) of an orbital motion of the can body 7 is also set at the downstream end of the first flat portion.

When the can holder 34 revolves about 15 degrees with respect to the zero point, the distance "d" between the can holder 34 and the upper end of the can body 7 is reduced to zero whereby the can body 7 adheres to the vacuum pad of the can holder 34. In this case, the cylindrical cam 25 is thus moved upwardly to increase the distance "d" between the can holder 34 and the upper end of the can body 7, and hence the feeding point of the can body 7 to the can holder 34 is shifted to the downstream side from that of the example shown in FIG. 7 in the rotational direction of the main turret 36. Then, when the can holder 34 further revolves about 60 degrees with respect to the zero point, the cam follower 28 reaches the second flat portion. Consequently, the can holder 34 is lowered in the downstroak amount A so that the man body 7 is fitted onto the mandrel 5. In this situation, however, the cylindrical cam 25 is moved upwardly toward the upper frame 24 and hence the lower end 7a of the can body 7 is still situated higher than the inner blade 10. That is, the lower end 7a of the can body 7 is not trimmed in the first trimming section 43. Then, when the can holder 34 further revolves about 134 degrees with respect to the zero point, the cam follower 28 reaches the third flat portion so that the can holder 34 is further lowered in the downstroak amount B. Consequently, the lower end 7a of the can body 7 is lowered again to be lower than the inner blade 10 and trimmed in the second trimming section 44. According to the example shown in FIG. 8, a trimmed amount sw2 of the can body 7 at the second trimming section is 16.5 mm. Then, as the example shown in FIG. 7, the can body 7 is delivered to the third trimming section 45 with the progression of the can holder 34, and further trimmed in the amount sw3 of 20.0 mm. As a result, a height "h" of the final product 47 is adjusted to 144.2 mm.

Thus, according to the height adjustment apparatus 1, each can body 7 is trimmed into a desired height by trimming away the lower opening end 7a thereof multiple times during one revolution of the main turret 36. According to the preferred example, therefore, the trimmed away scrap can be downsized, and a cutting load applied to the spindle shaft 6 to open the annular scrap can be reduced. In addition, the can bodies 7 can be fed and discharged continuously to/from the height adjustment apparatus 1 without stopping the apparatus. According to the preferred example, therefore, large number of can bodies can be trimmed promptly. Further, the trimming amount of the can body can be adjusted finely by manually adjusting a level of the cylindrical cam 25. According to the preferred example, therefore, can bodies other than standard shape may also be trimmed easily without requiring modification of the apparatus.

What is claimed is:

1. A height adjustment apparatus for adjusting a height of a cylindrical can body to a desired height by trimming one of opening ends of the can body, comprising:
   a plurality of mandrels on which the can body is individually mounted and which revolve along a predetermined orbit while rotating;
   a plurality of outer blades arranged around the revolution orbit of the mandrels;
   an inner blade fitted onto each mandrel to trim the opening end of the can body together with the outer blade; and
   a vertical reciprocator that gradually changes a level of the opening end of the can body with respect to a level at which the outer blade and the inner blade are situated from an upstream side toward a downstream side in a revolution direction of the mandrel.

2. The height adjustment apparatus as claimed in claim 1,
   wherein the outer blades are situated at a same level around the revolution orbit of the mandrels;
   wherein a level of each of the inner blade fitted onto the mandrel is adjusted to the same level as the outer blades to be opposed thereto; and
   wherein the vertical reciprocator is adapted to situate the opening end of the can body at a highest position within a range to be trimmed by the outer blade of the most upstream side, and to situate the opening end of the can body at a lowest position within a range to be trimmed by the outer blade of the most downstream side.

3. The height adjustment apparatus as claimed in claim 1, wherein the vertical reciprocator includes a cylindrical cam adapted to vertically reciprocate the can body by a rotational motion thereof.

* * * * *